United States Patent [19]
Hutchinson, deceased et al.

[11] 3,921,793
[45] Nov. 25, 1975

[54] REVERSIBLE BELT TENSIONING SYSTEM

[75] Inventors: Richard H. Hutchinson, deceased, late of Philadelphia, Pa.; by Claire T. Hutchinson, executrix, Philadelphia, Pa.

[73] Assignees: Sigmund Goodman, Toronto, Canada; Elliot L. Goodman, Philadelphia, Pa.; part interest to each

[22] Filed: July 8, 1974

[21] Appl. No.: 486,420

[52] U.S. Cl. ............................ 198/208; 74/242.13 A
[51] Int. Cl.² .................................. B65G 15/30
[58] Field of Search ............ 198/208; 74/242.13 A, 242.14 R, 74/520; 254/77, 79

[56] References Cited
UNITED STATES PATENTS

| | | | |
|---|---|---|---|
| 2,302,656 | 11/1942 | Dray | 198/208 |
| 2,413,265 | 12/1946 | Thompson | 198/208 |
| 2,555,194 | 5/1951 | Kojan et al. | 254/79 X |
| 2,920,751 | 1/1960 | Krupp et al. | 198/208 |

*Primary Examiner*—Evon C. Blunk
*Assistant Examiner*—Douglas D. Watts
*Attorney, Agent, or Firm*—Paul Maleson

[57] ABSTRACT

A reversible belt tensioning system for releasably securing an endless belt to a roller mechanism. A pair of toggle actuation mechanisms longitudinally displace a pair of bearing block mechanisms. The bearing block mechanisms are connected to a roller which frictionally engages the endless belt during normal operation. Actuation of the toggle mechanisms which are fixedly mounted to a stationary frame member, longitudinally displace the bearing block mechanisms and roller mechanism to a forward position where the roller frictionally engages the endless belt. Release of the toggle mechanisms drives the roller to a rearward position in response to an associated movement of the bearing block mechanisms to release the belt from contact with the roller.

3 Claims, 4 Drawing Figures

REVERSIBLE BELT TENSIONING SYSTEM

BACKGROUND OF THE INVENTION

1. Field of the Invention

This invention relates to the field of releasably securing endless or conveyor belts to belt shafts. In particular, this invention pertains to a system which permits frictional engagement and release of an endless belt to and from a driving or driven belt shaft or roller. More in particular, this invention pertains to a pair of toggle actuation mechanisms operable to longitudinally displace a pair of bearing blocks connected to a belt carrying roller.

2. Prior Art

Mechanisms for releasably securing endless belts to belt shafts are known in the art. However, some of these mechanisms include removing belt clamps which hold the belt together in a continuous contour. Removal of the belts from the belt shafts in this manner cause a great loss in operating time consequently resulting in higher operating costs. Further, release of the belt in this fashion may only be accomplished when the belt is not moving. Therefore, this method does not permit removal of the belt instantaneously which may be necessitated by failure of the operating machine.

Other prior art mechanisms permit the operator to move a taut belt from a large diameter shaft to a shaft of smaller diameter thereby causing belt slackening. Such mechanisms are usually used when the belts are moving and may be injurious to an operator. Further, various sized shaft members are necessary, increasing the cost of the operating machines.

In the food industry, in particular, the release of conveyor belts for cleaning purposes and other maintenance has long been a problem. To applicant's knowledge, there is no system for releasably securing a belt to a shaft through use of permanently mounted toggle actuation mechanisms acting in cooperation with a linearly moveable block mechanism.

SUMMARY OF THE INVENTION

A reversible belt tensioning system for releasably securing an endless belt to a rotational roller. The system includes a frame member having a pair of transversely displaced sidewalls extending in a longitudinal direction normal to the transverse displacement. A bearing block mechanism is movable with respect to the frame member in the longitudinal direction. The bearing block mechanism is secured to the rotational roller for displacement of the roller in the longitudinal direction responsive to the movement of the bearing block mechanism. A toggle actuation mechanism is mounted to the frame member and fastened to the bearing block mechanism for linearly displacing the bearing block mechanism in the longitudinal direction. A mechanism for mounting the bearing block mechanism and toggle actuation mechanism to the frame member is included where the bearing block mechanism is movable in the longitudinal direction with respect to the mounting mechanism.

DESCRIPTION OF THE PREFERRED EMBODIMENT

Figure 1:
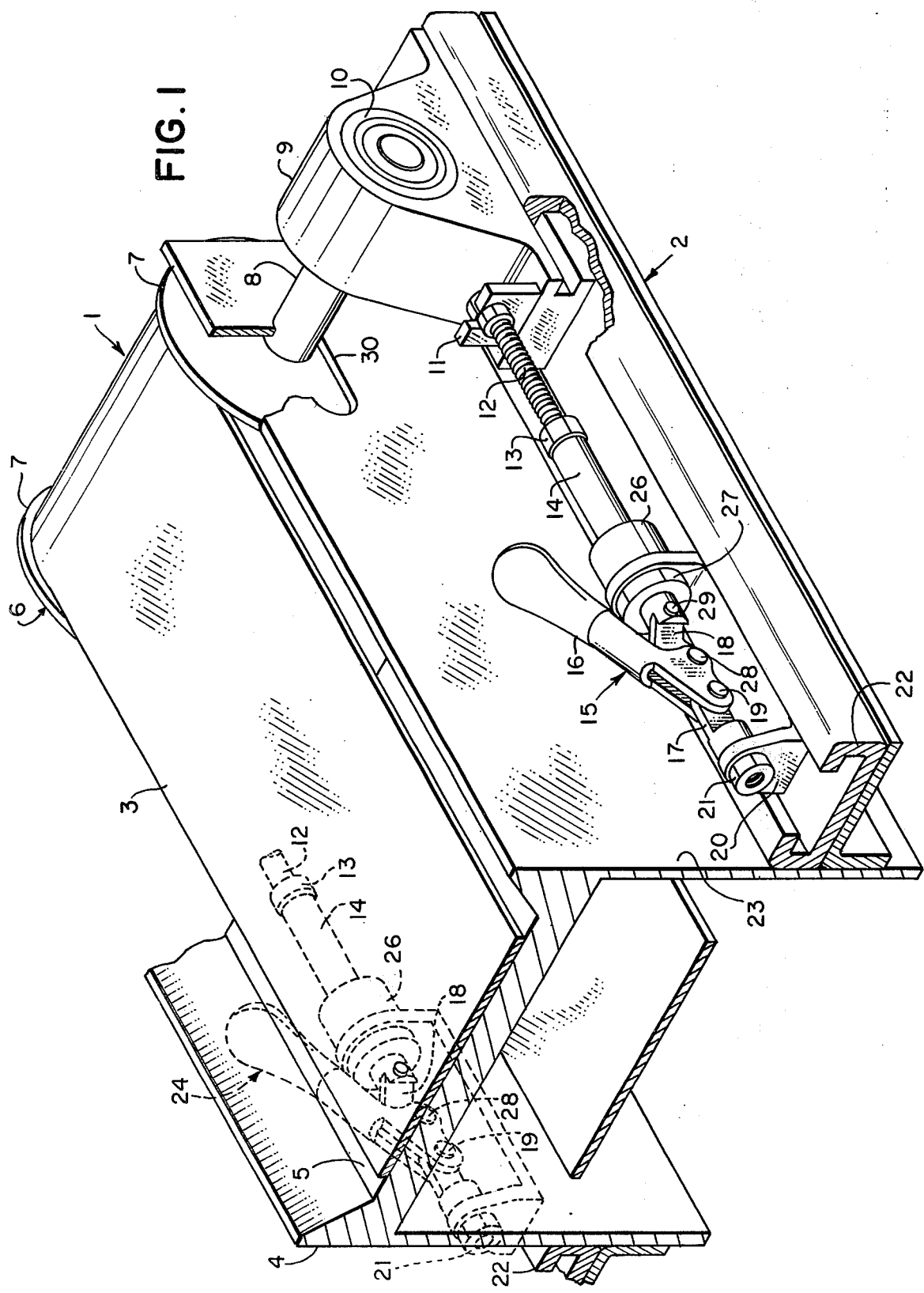
FIG. 1 is a perspective view, partially drawn in phantom lines showing the reversible belt tensioning system in an operating mode.
Figure 2:
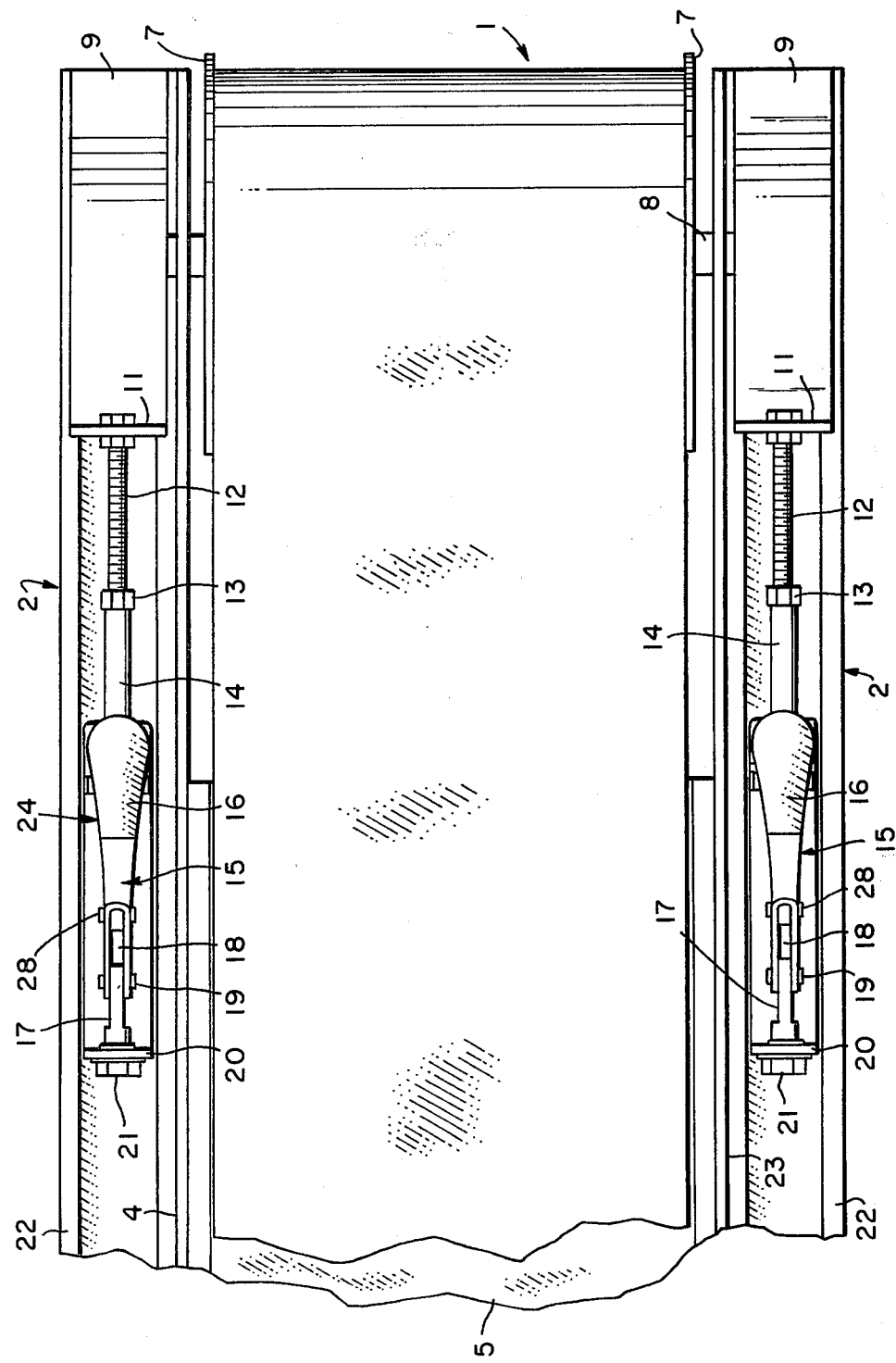
FIG. 2 is a top view of the reversible belt tensioning system.
Figure 3:
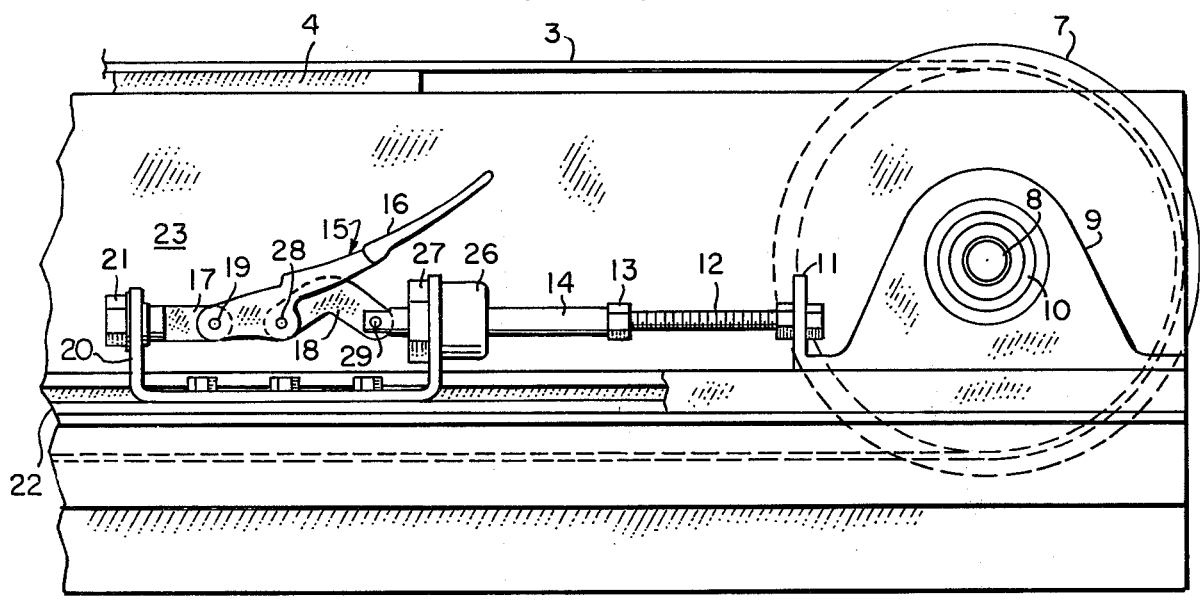
FIG. 3 is a side view partially fragmented of the reversible belt tensioning system showing the positional relationship of the toggle actuation mechanism when the conveyor belt is frictionally attached to the roller mechanism; and, FIG. 4 is a side view partially fragmented of the reversible belt tensioning system showing the positional relationship of the toggle actuation mechanism when the conveyor belt has been frictionally released from the roller mechanism.
Figure 4:
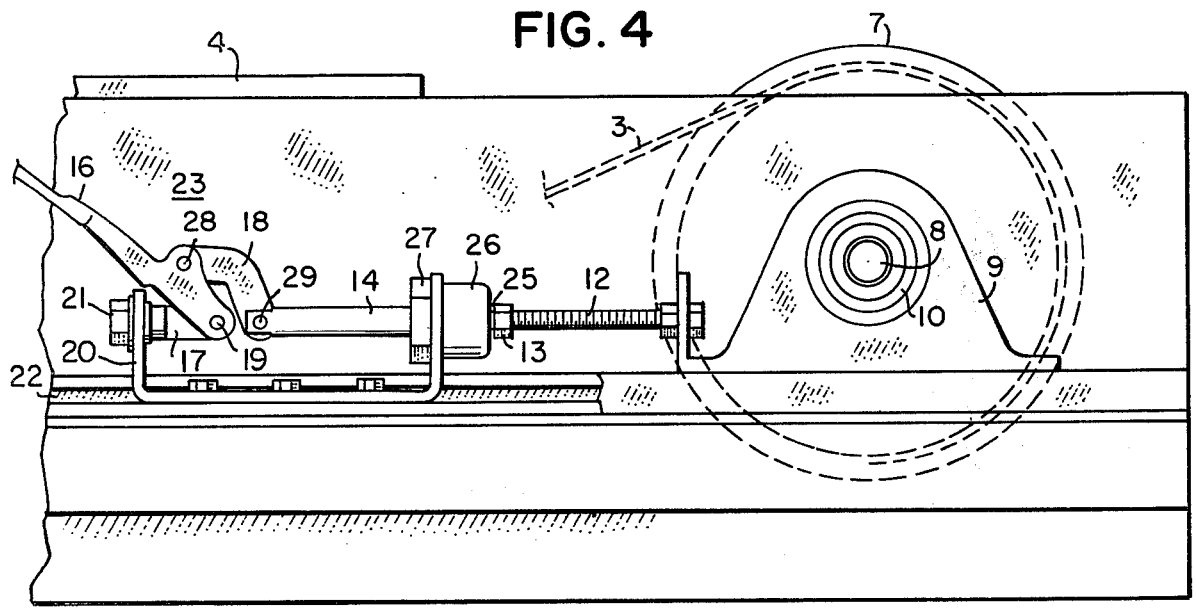

Referring now to FIGS. 1 and 2 there is shown belt tensioning mechanism or conveyor mechanism 1 for providing releasable securement between endless belt or conveyor 3 and belt roller mechanism 6. In general, belt tensioning mechanism or reversible belt tensioning system 1 is used to frictionally restrain endless belt 3 to rotating belt roller mechanism 6. In this manner, the rotational movement of roller mechanism 6 is transferred or converted to a linear motion of conveyor belt 3. When repair is necessitated or when conveyor belt 3 is to be cleaned or otherwise have maintenance done thereon mechanism 1 may be actuated to release belt 3 from roller mechanism 6 as will be detailed in the following paragraphs. Use of reversible belt tensioning system 1 allows the operator to perform maintenance on belt 3 without degrading any of the structural properties which may ensue if belt 3 must be cut or otherwise released from belt roller mechanism 6. System 1 includes a belt support frame or frame member 4 to which belt roller mechanism 6 is rotationally mounted. A bearing block mechanism 9 is mounted to belt roller 6 to permit longtudinal displacements of both block mechanism 9 and roller mechanism 6 as a function of the longitudinal displacements manefisted by movement of toggle actuation mechanism 24. Operation of toggle actuation mechanism 24 permits reversible longitudinal movement of block mechanism 9 and roller mechanism 6 resulting in either release or securement of conveyor belt 3 to rotational roller mechanism 6. As shown in FIGS. 1, 3 and 4, a clockwise rotation of grip or handle 16 longitudinally displaces bearing block 9 and roller mechanism 6 for frictional engagement between mechanism 6 and belt 3, thus defining a forward direction. Similarly, counterclockwise rotation of handle 16 defines a rearward motion of block 9 and roller mechanism 6.

Belt support frame or frame member 4 extends in a longitudinal direction defined by the linear longitudinal motion of endless belt 3. Frame member 4 includes a pair of transversely displaced side walls or support side frames 23 and are connected on an upper portion of frame 4 by a belt channel base member 5. In cross-section, frame 4 takes the form of a bridge member where endless belt 3 passes above and below belt channel base 5 as is clearly shown in FIG. 1. Belt channel base 5 extends longitudinally through only a portion of the extension of side walls 23 in order that roller mechanism or belt roller 6 is free to rotate without interfacing or otherwise contacting belt channel base member 5. Each of transversely displaced side walls 23 include a longitudinally directed channel or groove 30 having a vertical width substantially equal to but slightly greater than axle diameter 8. In this manner actuation of toggle mechanism 24 will permit longitudinal displacement of roller mechanism 6 with respect to the stationary belt support frame or frame member 4. Belt or conveyor 3 is maintained in alignment with belt roller mechanism 6 and further guided by a pair of transversely displaced pulleys 7 which have a diameter greater than the basic diameter of belt roller mechanism 6. Pulleys 7 therefore provide a restraint for belt 3 in the transverse direction while allowing belt 3 to be freely movable in the longitudinal direction.

Bearing block mechanism 9 is mounted to roller mechanism 6 through axle 8. Bearing 10 rotationally interfaces with axle 8 and with rotationally stationary but longitudinally movable bearing block 9. Axle 8 is secured in rigid fashion to belt roller mechanism 6 thereby forming a rotational restraint between axle 8 and roller mechanism 6. Axle 8 further interfaces with bearing 10 of block mechanism 9 to allow rotation of both mechanism 6 and axle 8 with respect to the rotationally stable bearing block 9. As will be described in the following paragraphs block 9 is longitudinally movable with respect to frame member or belt support frame 4 within a channel formed in mounting bracket or mounting mechanism 22. Longitudinal extension of channel or groove 30 permits movement of bearing block 9 in conjunction with axle and roller mechanism 6 through a predetermined longitudinal dimension. In this manner block 9 is secured to roller mechanism 6 for displacement of roller 6 in the longitudinal direction responsive to the movement of bearing block 9 in conjunction with actuation of toggle actuation means 24. It is therefore apparent that roller mechanism 6 is maintained in secured alignment to block mechanism 9 through the transversely directed axle 8 which is rigidly secured on a first end to roller mechanism 6 and further rotationally movable on a second end to block 9 through bearing 10.

Toggle actuation of mechanism 24 includes locking clamp base or toggle frame 20 which is rigidly mounted to mounting mechanism 22. Securement of toggle frame 20 to mounting mechanism 22 may be through bolts, welding or some like mechanism not important to the inventive concept. Toggle frame 20 is basically U-shaped in geometric form with stationary clamp bar 17 securely mounted to a vertical wall through restraining nut 21 as is shown. Clamp bar 17 is longitudinally directed internal and between the vertically directed wall members of toggle frame 20 as is shown. Linkage actuation mechanism 15, 18 is pivotally fastened to toggle frame 20 at a first pivot pin 19 defining a first pivot point of rotational lever or actuating bar 15. In this manner actuating or rotational lever is rotational in a plane coincident with the longitudinal direction and movable with respect to toggle frame 20 and stationary clamp bar 17. As is shown in FIGS. 1 and 2 actuating bar 15 includes a grip or handle 16 for manual rotation by an operator. The lower portion of rotational lever 15 is U-shaped in nature having opposing transversely displaced side walls which mate or interface with a flattened extension portion of clamp bar 17. Pivot pin 19 defining the first pivot point passes through the opposing walls or side members of lever 15 as well as through clamp bar 17 thereby allowing relative rotary motion between the elements. Within the lower U-shaped portion of actuating bar 15 there is positioned between the opposing walls a bar link 18 which is pivotally mounted to rotational lever 15 through a second pivot pin 28 defining a second pivot point. Pivot pin 28 thereby defines a first end of bar link 18 which is geometrically shaped in the form of an inverted V as is clearly seen in FIGS. 3 and 4. Movable clamp bar or bar link 18 is in turn pivotally mounted to displacement mechanism 14, 12 through pivot pin 29 defining a second end of bar link 18. Tubular shaft mounts 26 and 27 are secured to a vertical wall extension of toggle frame 20 as is shown. The vertical wall of frame 20 as well as tubular mounts 26, 27 include a longitudinally directed through passage of sufficient diameter such that tubular member or hollowed shaft 14 may freely move in the longitudinal direction with respect to belt support frame 4. Displacement mechanism 14, 12 is therefore attached or connected on opposing ends thereof to actuation linkage actuation mechanism 15, 18 and bearing block mechanism 9. The securement to block 9 is through a bolting attachment on strike plate or restraint plate 11 rigidly secured to bearing block 9. As is shown in FIG. 3 when rotational lever or actuating bar 15 is operationally moved in a clockwise direction displacement mechanism 14, 12 is longitudinally displaced to a position which frictionally engages roller mechanism 6 to endless belt or conveyor 3. When actuating bar 15 is operationally forced in a counter-clockwise direction as is shown in FIG. 4, clamp bar or bar link 18 exerts a longitudinally directed force on displacement mechanism 12, 14 in a rearward direction to pull bearing block 9 in a rearward longitudinal direction thereby releasing roller mechanism 6 from frictional engagement with belt 3.

Displacement mechanism 12, 14 includes an adjustment mechanism 12 whereby the positional relationship between bearing block mechanism 9 and toggle frame 20 may be adjusted or set to a particular positional displacement. Tubular member or shaft 14 includes a partial through opening wherein threaded bolt or elongated threaded element 12 may be inserted and fastened through a threaded nut 13 attached on one end of partially hollow shaft 14. In this manner, threaded bolt member 12 which is restrained to plate 11 attached to bearing block 9, may be rotated to positionally and initially affix the displacement between block 9 and toggle frame 20 as a matter of preference of the operator. The partial through opening extending in a longitudinal direction of shaft or tubular member 14 includes a diameter substantially equal to but slightly greater than the threaded diameter of elongated element 12. The nut 13 threadly engages the threaded bolt 12 and allows insertion of bolt 12 within the partial passage of tubular member 14 in the longitudinal direction as herein before defined.

Mounting mechanism 22 is secured to side wall 23 of frame member 4 through a mounting bracket, bolting, welding or some like means not important to the inventive concept as herein detailed. Mechanism 22 includes a channel within which toggle frame 20 is positionally secured and where bearing block mechanism 9 is free to move in a constrained linear longitudinal displacement. Mechanism 22 is basically C-shaped in geometric contour with extension elements insertable within a channel of bearing block 9 to restrain all motion of bearing block mechanism 9 with the exception of longitudinal displacement. In this manner mechanism 22 forms a channel member as is clearly seen in FIG. 1 within which bearing block 9 movably interfaces and wherein toggle frame 20 is securely fastened.

In construction, a pair of toggle actuation mechanisms 24, displacement mechanisms 12, 14 and bearing block mechanisms 9 may be mounted on opposing transversely displaced side walls 23 within respective mounting mechanisms 22 as is shown in FIG. 1. By adding opposing transversely displaced pairs of mechanisms 24, 14, 12 and 9 it is seen that a constant transversely actuated force may be applied to roller mechanism 6 and belt 3 thereby adding structural integrity to reversable belt tensioning system 1. General positional relationships of the various elements are as shown in FIG. 3, assuming that belt 3 is in rotational restraint with respect to roller mechanism 6. Where the operator is to provide some maintenance on the conveyor or belt 3 actuating bar or rotational lever 15 is forced in a counterclockwise manner as has been described. Rotation of actuating bar 15 causes both a rotation and linear displacement of bar link 18 which longitudinally pulls displacement mechanism 12, 14 through mounts 26 and 27 on secured to frame 20. Threaded element 12 exerts a rearward force on strike plate or restraint plate 11 which is attached to bearing block mechanism 9. Mechanism 9 is forced in a rearward longitudinal direction within the channels formed in the respective mounting mechanism 22 thereby releasing belt 3 from frictional restraint with respect to roller mechanism 6. In the released position nut member 13 is positionally adjacent to tubular shaft mount 26 and has a small displacement 25 there between. In this manner, as is seen in FIG. 4, belt 3 is released from a taut position and may be taken from roller mechanism 6.

In this manner, there has been herein shown and described a reversable belt tensioning system for providing frictional restraint as well as release to and from a roller mechanism 6. The tensioning system herein described provides for a simple, efficient, time saving, and easily manufacturable apparatus whereby conveyor belts may be manipulated easily. It will be understood that various changes and modifications may be made from the foregoing without departing from the spirit and scope of the appended claims.

What is claimed is:

1. A reversible belt tensioning system for releasably securing an endless belt to a rotational roller, comprising:
    a. a frame member having a pair of transversely displaced side walls extending in a longitudinal direction normal said transverse displacement;
    b. toggle actuation means mounted to said frame member, said toggle actuation means fastened to said bearing block means for linearly displacing said bearing block means in said longitudinal direction, said toggle actuation means including:
        1. a toggle frame rigidly secured to said mounting means within a longitudinally directed channel formed within said mounting means;
        2. linkage actuation means pivotally fastened to said toggle frame, said linkage actuation means including,
            a. a rotational lever having a first and second pivot point, said lever being rotational in a plane coincident with said longitudinal direction, said lever being pivotally mounted to said toggle frame at said first pivot point; and,
            b. a bar link pivotally mounted to said rotational lever second pivot point on a first end thereof and to said toggle displacement means on a second end thereof, said bar link for converting rotational motion of said rotational lever to longitudinal motion of said displacement means; and
        3. toggle displacement means slidably moveable in restrained linear longitudinal motion with respect to said toggle frame, said toggle displacement means being connected on opposing ends thereof to said linkage actuation means and said bearing block means respectively, and including adjustment means for maintaining a predetermined longitudinal displacement between said toggle frame member and said bearing block means; and,
    c. bearing block means moveable with respect to said frame member in said longitudinal direction said bearing block means secured to said rotational roller for displacement of said roller in said longitudinal direction responsive to said movement of said bearing block means, said bearing block means being longitudinally aligned with said toggle frame and being slidably moveable within said channel of said mounting means; and
    d. means for mounting said bearing block means and said toggle actuation means to said frame member said bearing block means being moveable in said longitudinal direction with respect to said mounting means.

2. The reversible belt tensioning system as recited in claim 1 wherein said elongated element threadedly engages said shaft member second end.

3. The reversible belt tensioning system as recited in claim 2 wherein said elongated element is fastened to a restraining plate of said bearing block means, said elongated element being releasable secured to said restraining plate.

* * * * *